(12) United States Patent
Choi et al.

(10) Patent No.: US 12,104,057 B2
(45) Date of Patent: Oct. 1, 2024

(54) CURABLE COMPOSITION AND OPTICAL MATERIAL COMPRISING CURED PRODUCT THEREOF

(71) Applicant: LG CHEM, LTD., Seoul (KR)

(72) Inventors: Hee Jung Choi, Daejeon (KR); Yeongrae Chang, Daejeon (KR); Heon Kim, Daejeon (KR); Hye Min Kim, Daejeon (KR); Youngsuk Kim, Daejeon (KR); Jaeyoung Kim, Daejeon (KR); Soonhwa Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 553 days.

(21) Appl. No.: 17/601,909

(22) PCT Filed: May 21, 2020

(86) PCT No.: PCT/KR2020/006625
§ 371 (c)(1),
(2) Date: Oct. 6, 2021

(87) PCT Pub. No.: WO2020/242127
PCT Pub. Date: Dec. 3, 2020

(65) Prior Publication Data
US 2022/0204767 A1   Jun. 30, 2022

(30) Foreign Application Priority Data

May 24, 2019 (KR) .......................... 10-2019-0061427

(51) Int. Cl.
*C08L 81/02* (2006.01)
*C08G 75/06* (2006.01)
*G02B 1/04* (2006.01)

(52) U.S. Cl.
CPC .............. *C08L 81/02* (2013.01); *C08G 75/06* (2013.01); *G02B 1/041* (2013.01)

(58) Field of Classification Search
CPC ............ C08L 81/02; C08G 75/06; G02B 1/04

USPC ......................................................... 523/400
See application file for complete search history.

(56) References Cited

U.S. PATENT DOCUMENTS

| | | | |
|---|---|---|---|
| 9,273,185 B2 | 3/2016 | Kariyazono et al. | |
| 9,283,185 B2 | 3/2016 | Kurzrock et al. | |
| 2010/0004421 A1 | 1/2010 | Horikoshi et al. | |
| 2012/0142889 A1 | 6/2012 | Aoki et al. | |
| 2016/0159962 A1* | 6/2016 | Imada | G03F 7/094 524/594 |
| 2018/0340044 A1 | 11/2018 | Kakinuma et al. | |

FOREIGN PATENT DOCUMENTS

| | | | |
|---|---|---|---|
| CN | 102459418 A | 5/2012 | |
| CN | 103562269 A | 2/2014 | |
| EP | 3351583 A1 | 7/2018 | |
| JP | 2000-256554 A | 9/2000 | |
| JP | 2005-272418 A | 10/2005 | |
| JP | 2010-001465 A | 1/2010 | |
| JP | 2011-212850 A | 10/2011 | |
| JP | 2011-225644 A | 11/2011 | |
| JP | 2013-028574 A | 2/2013 | |
| JP | 2013-124338 A | 6/2013 | |
| JP | 2013-227395 A | 11/2013 | |
| JP | 2014-047333 A | 3/2014 | |
| JP | 2015-199841 A | 11/2015 | |
| JP | 2015-212395 A | 11/2015 | |
| JP | 2016-216485 A | 12/2016 | |
| JP | 6098112 B2 | 3/2017 | |
| JP | 6179690 B1 | 7/2017 | |
| KR | 10-1608961 B1 | 4/2016 | |
| WO | WO-2012147710 A1 * | 11/2012 | ............... C09J 4/00 |

* cited by examiner

*Primary Examiner* — Deve V Hall
(74) *Attorney, Agent, or Firm* — Bryan Cave Leighton Paisner LLP

(57) ABSTRACT

A curable composition for forming a high refractive index optical material, the curable composition including an episulfide compound, a thiol compound and an aromatic ring compound containing two or more hydroxyl groups, and an optical material including a cured product of the curable composition.

16 Claims, No Drawings

CURABLE COMPOSITION AND OPTICAL MATERIAL COMPRISING CURED PRODUCT THEREOF

CROSS-REFERENCE TO RELATED APPLICATION(S)

This application is the U.S. national stage of International Application No. PCT/KR2020/006625, filed on May 21, 2020, which claims the benefit of Korean Patent Application No. 10-2019-0061427 filed on May 24, 2019, the disclosure of which is incorporated herein by reference in its entirety.

FIELD OF DISCLOSURE

The present disclosure relates to a curable composition for forming a high refractive index optical material, and an optical material comprising a cured product thereof.

BACKGROUND

Recently, a device for providing a 3D image to a user by using a virtual reality device and an augmented reality device has been developed. The virtual reality device or the augmented reality device can make desired images visible to a user by forming a diffraction light guide pattern on a lens such as common glasses.

In general, a lens for a virtual reality device or an augmented reality device uses glass having a high refractive index. Glass may have a high refractive index, light transmittance, flatness, strength, and anti-scratch effect, but can cause fatal damage to the user's eyeball when broken, and may cause discomfort from wearing it for a long period of time due to its high density and heavy weight.

On the other hand, in the case of high refractive plastics, the lens is comfortable to wear since it is lighter than a glass lens, the lens is not easily broken and relatively safer than a glass lens even if it is broken, and various colors can be implemented for the lens. However, there are problems for the high refractive plastics that it is difficult to implement a high refractive index and a high Abbe number compared to a glass lens. Thus, research is needed to improve these properties.

In addition, as the curable solution for forming a high refractive plastic contains a curing agent and/or a catalyst, it shows a tendency that the curing reaction rate increases and the viscosity increases rapidly. For this reason, the curable solution must be consumed in a short time after the curable solution is prepared, and there is a problem that it is difficult to store the remaining solution after use.

SUMMARY

The present disclosure provides a curable composition for forming a high refractive index optical material that can be stored for a long period of time and can prevent a striae phenomenon caused by rapid curing.

The present disclosure also provides an optical material that is lighter than glass or tempered glass used for conventional lenses, and capable of implementing various colors and a high-refractive index, while having excellent strength and hardness.

In one aspect, there is provided a curable composition comprising: an episulfide compound, a thiol compound and an aromatic ring compound containing two or more hydroxyl groups, wherein a weight ratio of the thiol compound and the aromatic ring compound containing two or more hydroxyl groups is 7:3 to 9:1.

In another aspect, there is provided an optical material comprising a cured product of an episulfide compound, a thiol compound and an aromatic ring compound containing two or more hydroxyl groups, wherein a weight ratio of the thiol compound and the aromatic ring compound containing two or more hydroxyl groups is 7:3 to 9:1.

Hereinafter, the curable composition and the optical material comprising a cured product thereof according to specific embodiments of the present disclosure will be described in more detail.

The terms used herein are used only to describe exemplary embodiments, and are not intended to limit the invention. A singular expression includes a plural expression unless they have definitely opposite meanings in the context.

It should be understood that the terms "comprise", "include", and "have" as used herein are intended to designate the presence of stated features, region, integer, step, action, element and/or component, but does not exclude a possibility of existence or addition of one or more other features, area, integer, step, action, element, component and/or group.

As used herein, the term "episulfide compound" refers to a compound containing one or more episulfides, wherein the episulfide refers to a compound in which the oxygen (O) atom of the epoxide is substituted with a sulfur (S) atom.

As used herein, the term "thiol compound" refers to a compound containing one or more thiol groups (—SH).

As used herein, the "curable" includes both heat-curable and photo-curable, and the "curable composition" includes a heat-curable and/or photo-curable composition.

As used herein, the high refractive index means a refractive index of about 1.6 or more at a wavelength ranging from 350 to 800 nm or at a wavelength of 532 nm.

According to an embodiment of the present disclosure, there is provided a curable composition comprising: an episulfide compound, a thiol compound and an aromatic ring compound containing two or more hydroxyl groups, wherein the weight ratio of the thiol compound and the aromatic ring compound containing two or more hydroxyl groups is 7:3 to 9:1.

Conventionally, it has been confirmed that the refractive index of the optical material, which is a cured product of the curable solution, tends to be higher as the content of sulfur atoms contained in the curable solution is increased, and thus, a thiol compound and the like have been included as a curing agent in the curable solution. However, in the case of a curable solution using a thiol compound, a curing reaction proceeded immediately after mixing, and a viscosity increased rapidly, and a striae phenomenon occurred due to rapid curing. Thus, the optical materials formed of these compositions had problems that the optical properties and physical properties are deteriorated.

The present inventors have found that when a curable composition includes an episulfide compound, a thiol compound and an aromatic ring compound containing two or more hydroxyl groups, and when the weight ratio of the thiol compound and the aromatic ring compound containing two or more hydroxyl groups is controlled to a specific weight ratio, long-term storage of the curable composition is possible because a rapid curing reaction does not occur immediately after mixing, and a striae phenomenon caused by rapid curing does not occur, and that the optical material, which is a cured product of such curable composition, is excellent in mechanical properties and optical properties while exhibiting a high refractive index such that an optical material that replaces glass or plastic materials used in the past can be provided, thereby completing the present disclosure.

Accordingly, the curable composition and the optical material containing a cured product thereof can be usefully applied to products or commercial applications, by replacing conventional glass or optical glass, such as display bases, display protective films, touch panels, lenses for wearable devices.

The weight ratio of the thiol compound and the aromatic ring compound containing two or more hydroxyl groups included in the curable composition according to the one embodiment may be 7:3 to 9:1, 7:3 to 8.5:1.5, or 7:3 to 8:2. When the weight ratio of the thiol compound and the aromatic ring compound containing two or more hydroxyl groups is less than 7:3, it may be difficult to implement a high refractive index, and when the weight ratio exceeds 9:1, it is difficult to control the curing rate during curing of the curable composition, a striae phenomenon may occur, and long-term storage of the curable composition may be difficult.

The episulfide compound contained in the curable composition may include a compound represented by the following Chemical Formula 1.

[Chemical Formula 1]

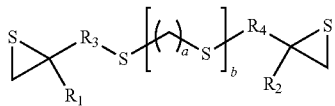

in Chemical Formula 1, $R_1$ and $R_2$ are each independently hydrogen or an alkyl having 1 to 10 carbon atoms, $R_3$ and $R_4$ are each independently a single bond or an alkylene having 1 to 10 carbon atoms, a is an integer of 0 to 4, and b is an integer of 0 to 6.

The episulfide compound represented by Chemical Formula 1 has an aliphatic chain-type skeleton in which episulfides are connected at both ends of the molecule, and in the aliphatic chain, the alkylene group may have a repeating unit in the form of a thio ether connected by a sulfur (S) atom.

The episulfide compound may contain a high content of sulfur (S) atoms having a large atomic refraction in the molecule due to the above-mentioned specific chemical structure, and the refractive index of the cured product can be increased by such high content of sulfur atoms.

Further, the episulfide compound can be cured by ring-opening polymerization, and the alkylene sulfide group formed by ring-opening polymerization of the episulfide group can further increase the high refractive index of the cured product.

Meanwhile, in Chemical Formula 1, $R_1$ and $R_2$ may be each independently hydrogen or a methyl group, but are not limited thereto.

Further, $R_3$ and $R_4$ may be each independently a single bond, methylene, ethylene, propylene, isopropylene, butylene, or isobutylene, but is not limited thereto.

Further, a and b may be each independently 0 or 1.

In Chemical Formula 1, a refers to the number of carbon atoms of the alkylene group contained in the thioether repeating unit. If a is too large, the length of the carbon chain in the molecule becomes longer, and the glass transition temperature of the cured product is lowered, which may cause a problem that the heat resistance of the cured product is lowered, and also may cause a problem that the refractive index of the cured product is lowered as the relative sulfur content becomes lower.

In Chemical Formula 1, b is the number of repetition of the thio ether repeating unit in which an alkylene group is connected by a sulfur (S) atom. If b is too large, the length of the carbon chain in the molecule becomes longer, and the glass transition temperature of the cured product is lowered, which may cause a problem that the heat resistance of the cured product is deteriorated.

Further, the compound represented by Chemical Formula 1 may be used alone, or in combination of two or more thereof.

The episulfide compound may include, for example, at least one selected from the group consisting of bis(β-epithiopropyl)sulfide, bis(β-epithiopropyl)disulfide, bis(β-epithiopropylthio)methane, 1,2-bis(β-epithiopropylthio)ethane, 1,3-bis(β-epithiopropylthio)propane, 1,4-bis(β-epithiopropylthio)butane, etc., but the present disclosure is not necessarily limited thereto.

The content of the episulfide compound may be 50 to 99% by weight, 60 to 95% by weight, or 70 to 90% by weight, based on 100% by weight of the total curable composition. If the content of the episulfide compound is too large, there is a problem that the content of a cured product such as a thiol compound is relatively low, and uncured by-products are generated, which lowers the glass transition temperature of the optical material as the cured product and increases the yellowness index (YI). On the other hand, if the content of the episulfide compound is too small, the content of a curing agent such as a thiol compound is relatively high, and the curing agent is not sufficiently dissolved in the curable composition, or uncured by-products are generated, which causes a problem that the glass transition temperature of the optical material of the cured product is lowered and the yellowness index is increased.

The thiol compound included in the curable composition may include at least one selected from compounds represented by the following Chemical Formula 2 or 3.

[Chemical Formula 2]

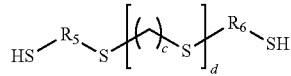

in Chemical Formula 2, $R_5$ and $R_6$ are each independently a single bond or alkylene having 1 to 10 carbon atoms, c is an integer of 0 to 4, d is an integer of 0 to 6,

[Chemical Formula 3]

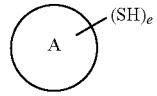

in Chemical Formula 3, ring A is a 5-membered or 6-membered aromatic hetero ring containing at least one of nitrogen (N) and sulfur (S) atoms, and e may be an integer of 1 to 3.

Specifically, the thiol compound represented by Chemical Formula 2 has an aliphatic chain-type skeleton in which thiol groups (—SH) are connected at both ends of the molecule, and in the aliphatic chain, the alkylene group may have a repeating unit in the form of a thio ether connected by a sulfur (S) atom.

On the other hand, in the thiol compound represented by Chemical Formula 3 may have at least one thiol group connected to a 5- or 6-membered aromatic ring containing a hetero atom such as nitrogen (N) and/or sulfur (S).

In the curing reaction with the episulfide compound, that is, in the ring-opening polymerization reaction of the episulfide group, the thiol compound represented by the following Chemical Formula 2 or 3 reacts with the episulfide group to form a disulfide bond or the like, thereby producing a cured product, and the refractive index of the cured product can be further increased by including a high content of sulfur (S) atoms having high atomic refraction in the molecule.

In the case of a curable composition containing only the episulfide compound and the thiol compound, the refractive index may be high, but a rapid curing reaction proceeds, which makes long-term storage difficult and causes a striae phenomenon. However, the curable composition according to the above-said embodiment of the present disclosure can prevent these problems due to rapid curing while maintaining high refractive index, excellent optical properties and mechanical properties, by containing the aromatic ring compound containing the two hydroxyl groups in the specific amount.

On the other hand, in the Chemical Formula 2, $R_5$ and $R_6$ may be each independently a single bond, methylene, ethylene, propylene, isopropylene, butylene, or isobutylene, but are not limited thereto.

Further, c and d may be each independently 0 or 1.

In Chemical Formula 2, c refers to the number of carbon atoms of the alkylene group contained in the thioether repeating unit. If c is too large, the length of the carbon chain in the molecule becomes longer, and the glass transition temperature of the cured product is lowered, which may cause a problem that the heat resistance of the cured product is lowered, and also may cause a problem that the refractive index of the cured product is lowered as the relative sulfur content becomes lower.

In Chemical Formula 2, d is the number of repetition of the thio ether repeating unit in which an alkylene group is connected by a sulfur (S) atom. If b is too large, the length of the carbon chain in the molecule becomes longer, and the glass transition temperature of the cured product is lowered, which may cause a problem that the heat resistance of the cured product is lowered.

Further, in Chemical Formula 3, ring A may be pyridine, pyrimidine, triazine, imidazole, thiophene, thiazole, or thiadiazole, but is not limited thereto.

Further, e may be 2 or 3.

Further, the compounds represented by Chemical Formula 2 or 3 may be used alone, or in combination of two or more thereof.

The thiol compound may include, for example, at least one selected from the group consisting of the following compounds.

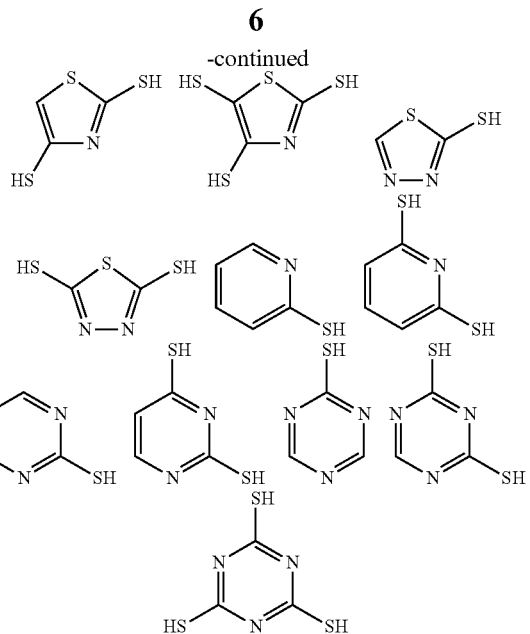

The content of the thiol compound may be 1 to 30% by weight, 5 to 25% by weight, or 7 to 10% by weight, based on 100% by weight of the total curable composition. If the content of the thiol compound is too high, the solid thiol compound is not sufficiently dissolved in the curable composition, or the content of other compositions such as the episulfide compound is relatively low, so uncured by-products are generated, which causes a problem that the glass transition temperature of the optical material of the cured product is lowered and the yellowness index is increased. On the other hand, when the content of the thiol compound is too low, the content of other compositions such as the episulfide compound is relatively high, so by-products are generated, which causes a problem that the glass transition temperature of the optical material of the cured product is lowered and the yellowness index is increased The aromatic ring compound containing two or more hydroxyl groups included in the curable composition may include at least one selected from compounds represented by the following Chemical Formulas 4 and 5.

[Chemical Formula 4]

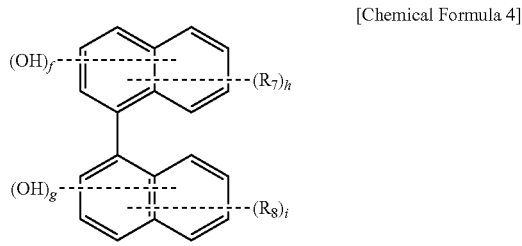

in the Chemical Formula 4, $R_7$ and $R_8$ are each independently deuterium, halogen, cyano, nitrile, nitro, amino, an alkyl having 1 to 40 carbon atoms, an alkoxy having 1 to 40 carbon atoms, a cycloalkyl having 3 to 40 carbon atoms, an alkenyl having 1 to 40 carbon atoms, an aryl having 6 to 60 carbon atoms, or a heteroaryl having 1 to 40 carbon atoms containing at least one of O, N, Si and S, f and g are each independently an integer of 1 to 7,
h and i are each independently an integer of 0 to 6,
f+h is 7 or less, g+i is 7 or less,

[Chemical Formula 5]

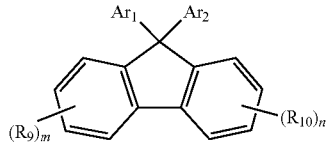

in the Chemical Formula 5, $Ar_1$ and $A_2$ are each independently an aryl having 6 to 60 carbon atoms in which one or more hydroxyl groups are substituted.

$R_9$ and $R_{10}$ are each independently deuterium, halogen, cyano, nitrile, nitro, amino, an alkyl having 1 to 40 carbon atoms, an alkoxy having 1 to 40 carbon atoms, a cycloalkyl having 3 to 40 carbon atoms, an alkenyl having 1 to 40 carbon atoms, an aryl having 6 to 60 carbon atoms, or a heteroaryl having 1 to 40 carbon atoms containing at least one of O, N, Si and S, and m and n are each independently an integer of 0 to 4.

Specifically, the aromatic cyclic compound containing two or more hydroxyl groups represented by Chemical Formula 4 has a skeleton to which two naphthalenes are connected, and one or more hydroxyl groups may be connected to each naphthalene.

On the other hand, the aromatic cyclic compound containing two or more hydroxyl groups represented by Chemical Formula 5 may include two aryl groups substituted with one or more hydroxyl groups at the 9th position of fluorene.

In the aromatic ring compound containing the two or more hydroxyl groups represented by Chemical Formula 4 or 5, in the curing reaction with the episulfide compound and the thiol compound, two or more hydroxyl groups undergo a ring-opening polymerization reaction with the episulfide compound to proceed crosslinking. Since the ring-opening polymerization reaction occurs at a reaction rate slower than that of the thiol compound, for example, $1/1000$, the curing reaction rate can be controlled. Further, in the aromatic ring compound containing two or more hydroxyl groups, the aromatic ring causes the ring-opening polymerization reaction at a reaction rate slower than that of the aliphatic hydroxyl group, for example, ½, the curing reaction rate can be controlled. Therefore, it is possible to prevent a rapid curing reaction from occurring even after mixing of the curable composition to control so that the curing reaction does not proceed for more than 7 days under long-term storage, for example, a temperature condition of 0° C., and furthermore, it is possible to prevent a striae phenomenon caused by rapid curing.

In addition, the aromatic cyclic compound containing two or more hydroxyl groups may implement a high refractive index of a cured product by the conjugation system of aromatic functional groups, and due to such an aromatic functional group, even if the content of the sulfur atom decreases as the aromatic ring compound is included in the curing composition, a decrease in the refractive index can be minimized, and further, the glass transition temperature (Tg) of the cured product can be increased, thus improving mechanical properties.

Meanwhile, in Chemical Formula 4, $R_7$ and $R_8$ may be each independently deuterium, halogen, cyano, nitrile, nitro, amino, methyl, or ethyl, but are not limited thereto.

Further, f and g may each independently be 1 or 2.

Further, h and i may each independently be 0 or 1.

Further, in Chemical Formula 5, $Ar_1$ and $Ar_2$ may be each independently phenyl or naphthalenyl which is substituted with 1 or 2 hydroxyl groups, but are not limited thereto.

Further, $R_9$ and $R_{10}$ may be each independently deuterium, halogen, cyano, nitrile, nitro, amino, methyl, or ethyl, but are not limited thereto.

Further, m and n may be each independently 0 or 1.

Further, the compounds represented by Chemical Formula 4 or 5 may be used alone or in combination of two or more.

The aromatic ring compound containing two or more hydroxyl groups may include, for example, at least one selected from the following compounds.

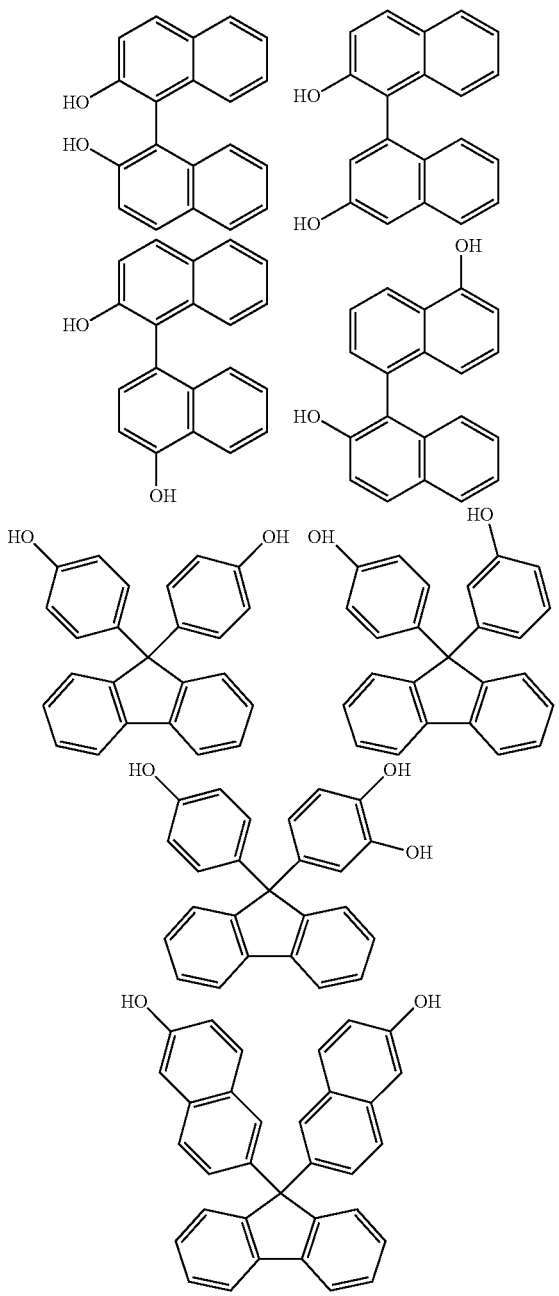

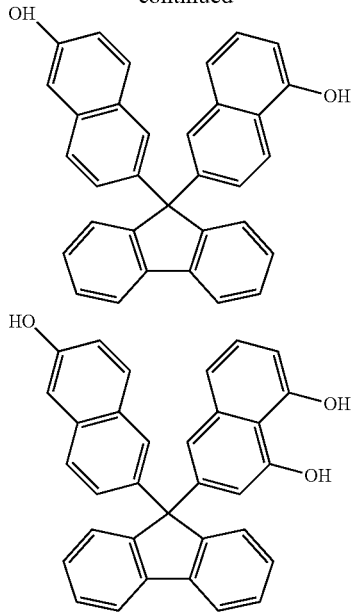

The content of the aromatic cyclic compound containing two or more hydroxyl groups may be 0.1 to 10% by weight, 0.5 to 5% by weight, or 1 to 3% by weight, based on 100% by weight of the total curable composition. If the content of the aromatic cyclic compound containing two or more hydroxyl groups is too large, there is a problem that it is not sufficiently dissolved in the curable composition or the refractive index is lowered after curing, and if the content is too small, there is a problem that the curing reaction rate is not controlled.

The curable composition according to the one embodiment may further include a catalyst.

The catalyst is not particularly limited as long as it serves to accelerate the curing reaction of the curable composition. Examples thereof include imidazole derivatives such as imidazole, 2-methylimidazole, 2-methylimidazole, 2-ethylimidazole, 2-ethyl-4-methylimidazole, 2-phenylimidazole, 4-phenylimidazole, 1-cyanoethyl-2-phenylimidazole, 1-(2-cyanoethyl)-2-ethyl-4-methylimidazole or the like; amine compounds such as dicyandiamide, benzyldimethylamine, 4-(dimethylamino)-N,N-dimethyl benzylamine, 4-methoxy-N,N-dimethylbenzylamine, 4-methyl-N,N-dimethylbenzylamine, N,N-dicyclohexylmethylamine or the like; hydrazine compounds such as adipic acid dihydrazide and sebacic acid dihydrazide; and phosphorus compounds such as triphenylphosphine. Further, examples of commercially available products include 2MZ-A, 2MZ-OK, 2PHZ, 2P4BHZ, 2P4MHZ manufactured by Shikoku Kasei Kogyo (all are product names of imidazole-based compounds), U-CAT3503N, UCAT3502T manufactured by San Apro (all are product names of blocked isocyanate compounds of dimethylamine), DBU, DBN, U-CATSA102, U-CAT5002 (all are bicyclic amidine compounds and salts thereof), etc.

The content of the catalyst may be 0.001 to 10% by weight, 0.01 to 5% by weight, or 0.1 to 1% by weight, based on 100% by weight of the total curable composition. If the content of the catalyst is too large, the curing reaction proceeds rapidly, there is a problem in handling the curable composition due to overheating, the long-term storage is difficult, and a striae phenomenon may occur. On the other hand, if the content of the catalyst is too small, the optical and mechanical properties may be deteriorated due to uncured.

Further, the curable composition may, in addition to the above, further include other additives used for imparting a specific function to a display substrate in the technical field to which the present disclosure pertains, such as an ultraviolet absorber, a bluing agent, and a pigment.

Further, the curable composition may be stored for a long period of time, and in particular, it may be stored for a long period of time even in a state in which a catalyst is contained. Moreover, it is possible to suppress a striae phenomenon caused by rapid curing. Specifically, the curable composition has a viscosity measured at room temperature (25° C.) after being held at a temperature of −5 to 0° C. for 12 hours, of 4000 cP or less, 3000 cP or less, 2500 cP or less, 2000 cP or less, 1000 cP or less, 500 cP or less, 300 cP or less, or 100 to 200 cP.

According to another embodiment of the invention, there is provided an optical material comprising a cured product of an episulfide compound, a thiol compound and an aromatic ring compound containing two or more hydroxyl groups, wherein the weight ratio of the thiol compound and the aromatic ring compound containing two or more hydroxyl groups is 7:3 to 9:1.

The weight ratio of the thiol compound and the aromatic ring compound containing two or more hydroxyl groups included in the optical material may be 7:3 to 9:1, 7:3 to 8.5:1.5, or 7:3 to 8:2. If the weight ratio of the thiol compound and the aromatic ring compound containing two or more hydroxyl groups is less than 7:3, it may be difficult to implement a high refractive index, and if the weight ratio exceeds 9:1, a striae phenomenon may occur.

In addition, the episulfide compound, the thiol compound and the aromatic ring compound containing two or more hydroxyl groups, the additive and the like which are contained in the optical material are replaced by those described in the above-mentioned photocurable composition.

Such an optical material can be produced by the method of curing the above-mentioned curable composition. Specifically, the above-mentioned curable composition or a uniform composition containing various additives in the curable composition is prepared, and the composition is injected into a mold frame made by combining a mold made of a component such as glass, metal, or polymer resin with a resinous gasket, and then heated and cured. At this time, in order to facilitate the extraction of the finally prepared resin after molding, the mold may be subjected to a release treatment in advance, or a release agent may be further added to the above-described composition for use.

The temperature of the curing reaction may vary depending on the type and content of the compound used. In general, the curing may proceed at about 50 to about 120° C., or about 60 to about 100° C., and the curing time may be about 0.1 to about 72 hours, or about 0.5 to about 24 hours.

The curing reaction may be performed by combining a step of maintaining the above-mentioned predetermined polymerization temperature for a certain period of time, a temperature raising step, a temperature lowering step, and the like. After completion of the reaction, post-treatment can be performed at a temperature condition of about 50 to about 150° C., or about 80 to about 120° C. for about 10 minutes to about 3 hours, thereby preventing deformation.

The optical material released after polymerization may have various functionalities through processes such as dyeing, coating, and the like.

The optical material according to the other embodiment may have a refractive index of 1.65 or more, 1.650 to 1.800, 1.700 to 1.800, or 1.700 to 1.750.

Further, the optical material may have a very high transmittance, specifically, a transmittance value measured in accordance with JIS K 7361 when the thickness is 1 mm, of 80% or more, 80 to 99%, or 85 to 90%, and.

Further, the optical material may have a very low haze, specifically, a haze value measured according to JIS K 7136 when the thickness is 1 mm, of 1% or less, 0.01 to 1%, or 0.01 to 0.5%.

Further, the optical material may have a yellowness index (YI), specifically, a yellowness index measured according to ASTM E313-1973, of 1 to 30, 2 to 22, 2.1 to 10, 2.2 to 5, or 2.3 to 4, which exhibits low yellowness index.

The optical material according to the other embodiment may be included in the wearable device, and specifically, it can be used in place of glass or tempered glass for a lens of a wearable device.

That is, the optical material has high refractive properties comparable to glass, and also is lighter than glass or tempered glass, and in addition to mechanical properties such as strength and hardness, has excellent optical properties as described above, and thereby, can be used as a lens of a wearable device such as an augmented reality device or a virtual reality device.

Advantageous Effects

According to the present disclosure, it is possible to provide a curable composition that can be stored for a long period of time and can prevent a striae phenomenon caused by rapid curing, and it is possible to provide an optical material which comprises a cured product of the curable composition, and which not only is lighter than glass or tempered glass used for conventional lenses, can realize various colors while having excellent strength and hardness, and can realize a high-refractive index.

DETAILED DESCRIPTION

Hereinafter, the actions and effects of the invention will be described in more detail through specific examples of the invention. However, these examples are for illustrative purposes only, and the scope of rights of the invention is not determined thereby.

Example 1

90 g of the following 70A as an episulfide compound, 9 g of the following 70B as a thiol compound, and 1 g of the following A1 as an aromatic ring compound containing two or more hydroxyl groups were vigorously mixed at 20° C. for 1 hour, and then the mixture was filtered using a glass filter having a pore size of 1 μm and then filtered once again using a PVDF filter having a pore size of 0.45 μm. Then, 0.5 g of N,N-dicyclohexylmethylamine was added as a catalyst and mixed for 5 minutes to prepare a curable composition.

A 1 mm thick slide glass was placed on both sides of a LCD glass having a size of 10 cm in width and length, and about 5 g of the above-mentioned mixed solution was applied to the center of the LCD glass, and then covered with another LCD glass to prepare a mold. This was put in an oven and the curing reaction was performed at about 60° C. for about 10 hours and at about 90° C. for about 4 hours. After taken out of the oven, the LCD glass was removed to obtain a flat plastic specimen (optical material). The thickness of the plastic specimen was about 1 mm, and this thickness was measured using a Mitutoyo thickness gauge (Model: ID-C112XBS).

Examples 2 to 8 and Comparative Examples 1 to 3

A curable composition and a plastic specimen (optical material) as a cured product thereof were prepared in the same manner as in Example 1, except that the episulfide compound, the thiol compound and the aromatic ring compound containing two or more hydroxyl groups were used in the amount of the compounds shown in Table 1 below.

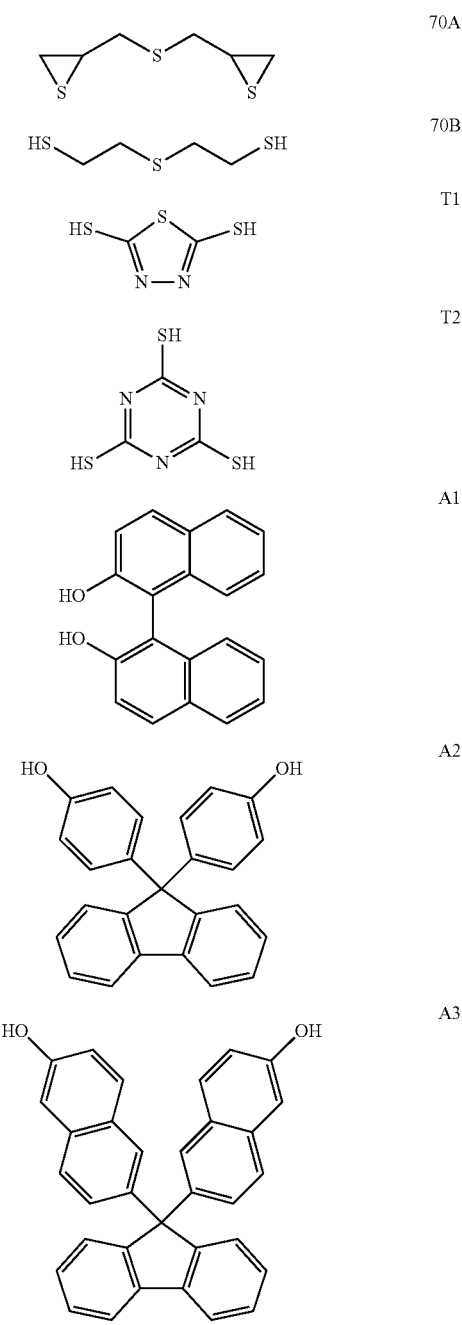

TABLE 1

| (unit: g) | 70A | 70B | T1 | T2 | A1 | A2 | A3 |
|---|---|---|---|---|---|---|---|
| Example 1 | 90 | 9 | — | — | 1 | — | — |
| Example 2 | 90 | — | 9 | — | 1 | — | — |
| Example 3 | 90 | 1 | 8 | — | 1 | — | — |
| Example 4 | 90 | — | — | 9 | 1 | — | — |
| Example 5 | 90 | — | 8 | — | 2 | — | — |
| Example 6 | 90 | — | 7 | — | 3 | — | — |
| Example 7 | 90 | — | 9 | — | — | 1 | — |
| Example 8 | 90 | — | 9 | — | — | — | 1 |
| Comparative Example 1 | 90 | 10 | — | — | — | — | — |
| Comparative Example 2 | 90 | — | 10 | — | — | — | — |
| Comparative Example 3 | 90 | — | — | 10 | — | — | — |
| Comparative Example 4 | 90 | 9.3 | | | 0.7 | | |
| Comparative Example 5 | 90 | 9.5 | | | | 0.5 | |
| Comparative Example 6 | 90 | 6.7 | | | 3.3 | | |
| Comparative Example 7 | 90 | 6.5 | | | | 3.5 | |

Evaluation of Physical Properties

1. Evaluation of Optical Properties (Transmittance, Haze and Yellowness Index)

The transmittance, haze, and yellowness index of the sample were measured in the thickness direction of the cured product cured to a 1 mm standard thickness using COH-400 spectrometer manufactured by Nippon Denshoku Industries Co., Ltd., and the results are shown in Table 2 below.

2. Measurement of Sulfur Atom Content

The content of sulfur atoms in the specimen was measured using an elemental analysis method, and the results are shown in Table 2 below.

3. Measurement of Refractive Index

For the specimen, the refractive index value at a wavelength of 532 nm was measured using spectroscopic ellipsometry manufactured by Ellipso Technology, and the results are shown in Table 2 below.

4. Measurement of Viscosity Before and After Long-Term Storage

Immediately after the preparation of the curable composition, the viscosity was measured at room temperature (25° C.) using Viscometer TV-22 viscometer manufactured by Toki Sangyo, and the results are shown in [Viscosity—Initial] of Table 2 below. Subsequently, the curable composition was maintained at a temperature of −5° C. for 12 hours, and then the viscosity was measured at room temperature (25° C.) in the same manner. The results are shown in [viscosity—after 12 hours] in Table 2 below.

TABLE 2

| | Transmittance (%) | Haze (%) | Yellowness index (YI) | Sulfur atom content (wt. %) | Refractive index | Viscosity (cP) Initial | Viscosity (cP) After 12 hours |
|---|---|---|---|---|---|---|---|
| Example 1 | 87.4 | 0.3 | 3.2 | 54.15 | 1.723 | 100 | 3000 |
| Example 2 | 87.5 | 0.3 | 3.4 | 54.30 | 1.741 | 100 | 2500 |
| Example 3 | 87.3 | 0.3 | 3.3 | 54.28 | 1.740 | 100 | 2500 |
| Example 4 | 86.8 | 0.3 | 21.5 | 53.42 | 1.738 | 100 | 4000 |
| Example 5 | 87.6 | 0.3 | 3.7 | 53.66 | 1.739 | 100 | 500 |
| Example 6 | 87.5 | 0.3 | 3.7 | 53.02 | 1.736 | 100 | 200 |
| Example 7 | 87.7 | 0.3 | 2.4 | 54.30 | 1.730 | 100 | 2500 |
| Example 8 | 87.5 | 0.3 | 3.0 | 54.30 | 1.734 | 100 | 3000 |
| Comparative Example 1 | 88.0 | 0.3 | 3.4 | 54.77 | 1.705 | 100 | Cured |
| Comparative Example 2 | 87.5 | 0.4 | 3.6 | 54.94 | 1.730 | 100 | Cured |
| Comparative Example 3 | 86.7 | 0.3 | 26.3 | 53.96 | 1.732 | 100 | cured |
| Comparative Example 4 | 87.3 | 0.3 | 6.7 | 54.33 | 1.702 | 100 | 5000 |
| Comparative Example 5 | 87.3 | 0.3 | 7.8 | 54.45 | 1.703 | 100 | cured |
| Comparative Example 6 | 87.4 | 0.7 | 8.5 | 52.71 | 1.699 | 100 | 200 |
| Comparative Example 7 | 86.4 | 1.2 | 12.4 | 52.58 | 1.695 | 100 | 200 |

Referring to Table 2, it can be seen that the specimen including the cured product according to Examples of the present disclosure exhibits very high transmittance, and has a relatively high refractive index while having low haze and yellowness index value. Also, it can be seen that the curable composition according to Examples of the present disclosure does not cure even after being stored for 12 hours, and thus, can be stored for a long period of time even if it is not used immediately after preparation. In particular, in the case of Examples 5 and 6, it was confirmed that the viscosity was as very low as 500 cP or less, even after storage for 12 hours.

On the other hand, it was confirmed that in the case of the curable compositions of Comparative Examples 1 to 3, curing occurred for all the curable compositions after storage for 12 hours, and long-term storage was not possible. Consequently, there is a problem that it is difficult to utilize the curable compositions of Comparative Examples 1 to 3 for lenses and the like, and occurrence of a striae phenomenon due to rapid curing may be predicted.

In addition, it was confirmed that in the case of the curable compositions of Comparative Examples 4 and 5, viscosity increased or curing occurred after storage for 12 hours to such an extent that molding into a high refractive lens and the like was impossible. Consequently, there is a problem that it is difficult to utilize the curable compositions of Comparative Examples 4 and 5 for a lens and the like, and occurrence of a striae phenomenon due to rapid curing may be predicted.

Furthermore, it was confirmed that in the case of the curable compositions of Comparative Examples 6 and 7, the haze and the yellowness index of the specimen including the cured product were high and the refractive index was as low as less than 1.70, and thus the curable compositions were not suitable for use as a composition for forming a high refractive index lens for a wearable device.

What is claimed is:

1. A curable composition for forming a high refractive index optical material, the curable composition comprising:
   an episulfide compound;
   a thiol compound; and
   an aromatic ring compound containing two or more hydroxyl groups,
   wherein a weight ratio of the thiol compound and the aromatic ring compound containing two or more hydroxyl groups is 7:3 to 9:1.

2. The curable composition according to claim 1, wherein the weight ratio of the thiol compound and the aromatic ring compound containing two or more hydroxyl groups is 7:3 to 8:2.

3. The curable composition according to claim 1, wherein the episulfide compound comprises a compound represented by the following Chemical Formula 1.

[Chemical Formula 1]

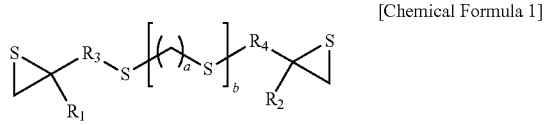

wherein in Chemical Formula 1, $R_1$ and $R_2$ are each independently hydrogen or an alkyl having 1 to 10 carbon atoms, $R_3$ and $R_4$ are each independently a single bond or an alkylene having 1 to 10 carbon atoms, a is an integer of 0 to 4, and b is an integer of 0 to 6.

4. The curable composition according to claim 1, wherein the thiol compound comprises at least one selected from compounds represented by the following Chemical Formula 2 or 3.

[Chemical Formula 2]

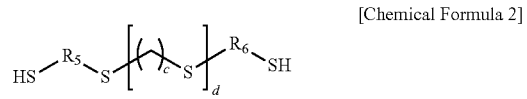

wherein in Chemical Formula 2, $R_5$ and $R_6$ are each independently a single bond or alkylene having 1 to 10 carbon atoms, c is an integer of 0 to 4, d is an integer of 0 to 6,

[Chemical Formula 3]

wherein in the Chemical Formula 3, ring A is a 5-membered or 6-membered aromatic hetero ring containing at least one of nitrogen (N) and sulfur (S) atoms, and e is an integer of 1 to 3.

5. The curable composition according to claim 1, wherein the aromatic ring compound containing two or more hydroxyl groups comprises at least one selected from compounds represented by the following Chemical Formulas 4 and 5.

[Chemical Formula 4]

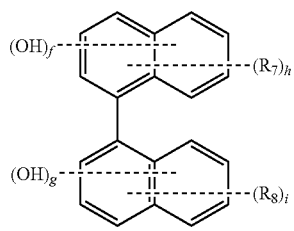

wherein in the Chemical Formula 4, $R_7$ and $R_8$ are each independently deuterium, halogen, cyano, nitrile, nitro, amino, an alkyl having 1 to 40 carbon atoms, an alkoxy having 1 to 40 carbon atoms, a cycloalkyl having 3 to 40 carbon atoms, an alkenyl having 1 to 40 carbon atoms, an aryl having 6 to 60 carbon atoms, or a heteroaryl having 1 to 40 carbon atoms containing at least one of O, N, Si and S, f and g are each independently an integer of 1 to 7, h and i are each independently an integer of 0 to 6, f+h is 7 or less, g+i is 7 or less,

[Chemical Formula 5]

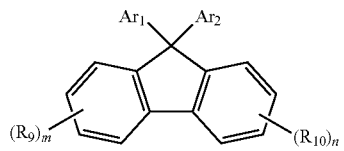

wherein in the Chemical Formula 5, $Ar_1$ and $A_2$ are each independently an aryl having 6 to 60 carbon atoms in which one or more hydroxyl groups are substituted.

$R_9$ and $R_{10}$ are each independently deuterium, halogen, cyano, nitrile, nitro, amino, an alkyl of 1 to 40 carbon atoms, an alkoxy having 1 to 40 carbon atoms, a cycloalkyl having 3 to 40 carbon atoms, an alkenyl having 1 to 40 carbon atoms, an aryl having 6 to 60 carbon atoms, or a heteroaryl having 1 to 40 carbon atoms containing at least one of O, N, Si and S, and m and n are each independently an integer of 0 to 4.

6. The curable composition according to claim 1, wherein the episulfide compound comprises at least one selected from the group consisting of bis(β-epithiopropyl)sulfide, bis(β-epithiopropyl)disulfide, bis(β-epithiopropylthio)methane, 1,2-bis(β-epithiopropylthio)ethane, 1,3-bis(β-epithiopropylthio)propane, and 1,4-bis(β-epithiopropylthio)butane.

7. The curable composition according to claim 1, wherein the thiol compound comprises at least one selected from the group consisting of the following compounds:

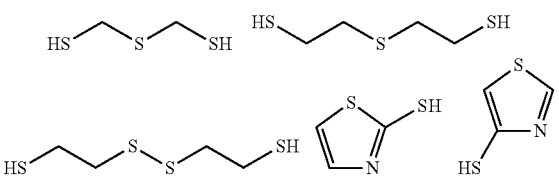

-continued

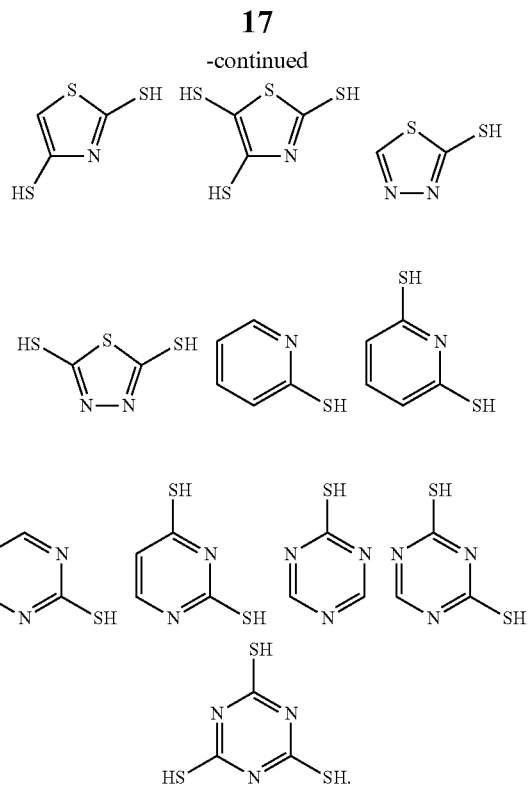

8. The curable composition according to claim 1, wherein
the aromatic ring compound containing two or more hydroxyl groups comprises at least one selected from the following compounds:

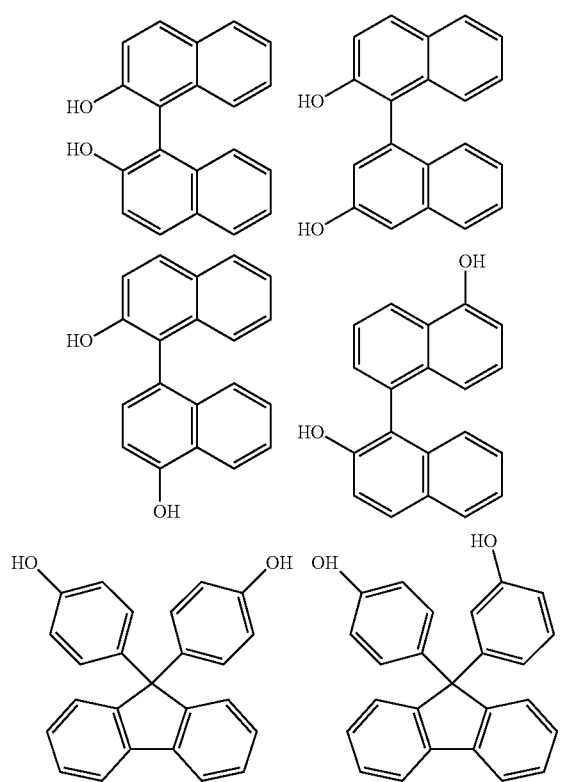

-continued

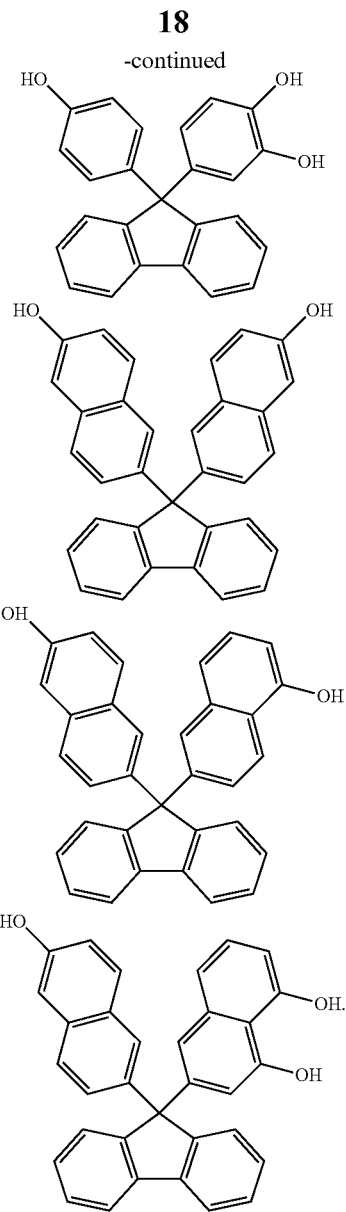

9. The curable composition according to claim 1, wherein the curable composition further comprises a catalyst.

10. The curable composition according to claim 1, wherein
the curable composition has a viscosity of 4000 cP or less after being held at a temperature of −5° C. for 12 hours.

11. An optical material comprising
a cured product of a curable composition, the curable composition includes:
an episulfide compound;
a thiol compound;
and an aromatic ring compound containing two or more hydroxyl groups,
wherein a weight ratio of the thiol compound and the aromatic ring compound containing two or more hydroxyl groups is 7:3 to 9:1.

12. The optical material according to claim 11, wherein the optical material has a refractive index of 1.65 or more.

13. The optical material according to claim 11, wherein the optical material has a transmittance of 80% or more.

14. The optical material according to claim 11, wherein the optical material has a haze of 1% or less.

15. The optical material according to claim 11, wherein the optical material has a yellowness index (YI) of 1 to 30.

16. The optical material according to claim 11, wherein the optical material is for a lens of a wearable device.

* * * * *